of my relay, I will refer to Fig. 1 of the drawings which shows the relay connected in a starting system for synchronous motors. A synchronous motor having an armature 22 and a direct current excited field 23 is shown with conductors 24, 25 and 26 connected to one set of terminals of a main switch 27. The other set of terminals of main switch 27 is connected to supply line conductors 28, 29 and 30. Since one of the features of the present invention is the avoidance of manual control, means are provided for actuating main switch 27. A closing coil 31 is provided for closing main switch against the action of an opening spring and one end of this coil is connected directly to main line conductor 29 by a lead 32. The other end of coil 31 is connected by wire 33 to one terminal of a starting button 34. A wire 35 connects the other terminal of the starting button with one terminal of a stopping button 36. Starting button 34 is normally held in an open circuit position and stopping button 36 is normally held in a closed circuit position. The other terminal of stopping button 36 is connected by conductor 37 with a pair of serially connected overload relays 38 and 39, which are connected by a wire 40 with main line conductor 30. Fuse 41 forms a part of conductor 32 and fuse 42 and safety plug 43 form a part of conductor 40.

With coil 31 connected as described it will be energized upon operation of starting button 34 to close the circuit. Upon exciting coil 31 its core or armature (not shown) will be shifted and main switch 27 will be closed against the action of a conventional spring. A conventional latch mechanism should be associated with the main switch to retain it in closed position and the latch mechanism is actuated by a latching coil 44.

As shown diagrammatically in Fig. 1, closing of main switch 27 also effects closing of an auxiliary switch 45 which is utilized to complete a circuit through latching coil 44. One end of coil 44 is connected by wire 32 with main line conductor 29 and the other end of this coil is connected by wire 46 with one terminal of switch 45. The other terminal of switch 45 is connected by wire 47 to wire 35 which is serially connected by stop button 36, wire 37, overload relays 38, 39 and conductor 40 with main line conductor 30. With these connections it will be realized that upon closing of main switch 27, coil 44 will be energized to latch the main switch in closed position. When the main switch is to be opened push button 36 is actuated to break the circuit through coil 44 which releases the latch and permits the spring to open the main switch.

Upon closing the main switch 27, current is supplied to conductors 24, 25 and 26 and the armature 22 is energized. At this time coil 18 of the relay I being connected by wires 48 and 49 with conductors 25 and 26, respectively, is energized and a torque is created tending to rotate shaft 12 to effect closing of contacts 5 and 8. Simultaneously, however, coil 20 is energized which prevents the closing of contacts 5 and 8. One terminal of coil 20 is connected directly by wire 50 with a terminal of the secondary of transformer T the primary of which is excited by the current flowing through conductor 24. The other terminal of the secondary of transformer T is connected by wire 51 to the terminal of a switch 52 which is closed until the synchronous motor approaches synchronous speed.

A wire 53 connects switch 52 to one terminal of each of the coils of overload relays 38 and 39. The other terminal of the coil of overload relay 39 is connected by lead 54 with coil 20 thus completing the circuit through coil 20.

As the current induced in the secondary of transformer T is proportional to the armature current of the synchronous motor, the current flowing through coil 20 will be very high when the motor is first started and will decrease as the speed of the motor increases. Consequently the torque action on shaft 12 created by the magnetic flux generated in coil 20 will far exceed the torque created by coil 18 when the motor is first started.

As the speed of the rotor of the motor increases, the armature current is gradually reduced and the frequency of the pulsations of said current is likewise reduced until finally a speed is reached at which it is desirable to apply the direct current excitation to the synchronous motor. Coil 20 and the relay are so constructed that when the armature current is sufficiently reduced, the torque created by coil 20 will be correspondingly reduced and an equilibrium is established in the relay. However, as the frequency of armature current pulsations approaches the natural frequency of the relay a condition of unstable equilibrium is set up in the relay and as the "voltage coil" 18 will then exert a predominating torque on shaft 12, the latter will be shifted to allow contacts 5 and 8 to close.

Closing of contacts 5 and 8 of the relay completes a circuit from conductor 26 through wire 49, through wire 55 to a terminal of closing coil 56 of the direct current circuit switch 57, from the other terminal of coil 56 through wires 58 and 32 to conductor 29. Switch 57 is held in open position by a suitable conventional spring (not shown) until closed by the action of coil 56. It will be realized that as long as the "voltage coil" 18 of the relay creates the predominating torque on shaft 12, switch 57 will remain closed.

At this point it should be noted that switch 52 is controlled by switch 57 and is closed when switch 57 is open and vice versa. The purpose of switch 52 is to shunt the alternating current ammeter 59, which is connected by wire 60 with wire 51 and by wire 61 with wire 53, while the armature current is excessive during the starting period of the motor. After switch 52 is open current from wire 51 flows through wire 60, ammeter 59, wire 61, coil of overload relay 39, wire 54, coil 20, and wire 50 back to transformer T. A second transformer T' may be provided to actuate the overload relay 38 upon the flow of an unusual current through the armature of the motor. The secondary of this transformer is connected at one end to wire 51 and at the other end to wire 62 which, in turn, is connected to one end of the coil of overload relay 38.

Direct current supply lines 63 and 64 are connected to terminals of switch 57. Upon closing of switch 57 conductor 64 is connected directly by wire 65 to the rotor winding 23 of the synchronous motor and wire 63 is connected through wire 66, direct current ammeter 67 and wire 68 to winding 23.

Switch 57 also serves to actuate a switch 69 for placing a resistance 70 across conductors 65 and 68 to discharge the field. Switch 69 is closed when switch 57 is open and is open when switch Jan. 4, 1938. E. C. MOLKE 2,104,665
SHEET PILING
Filed March 7, 1935 3 Sheets-Sheet 2

Inventor.
E. C. MOLKE.
per
Attorney.

Patented Jan. 4, 1938

2,104,665

UNITED STATES PATENT OFFICE 2,104,665

SHEET PILING

Eric C. Molke, Montreal, Quebec, Canada

Application March 7, 1935, Serial No. 9,862
In Canada June 2, 1934

13 Claims. (Cl. 61—58)

This invention relates to improvements in sheet piles of reinforced concrete or of metal and in piling constructed of piles as herein provided. The primary object of the invention is to provide sheet piles so constructed that adjoining piles may be locked together against relative movement in their longitudinal directions, whereby extremely rigid stable structures capable of resisting great lateral pressure may be produced. A further object is to provide sheet piles adapted to be held against movement out of alignment and/or held against separation edgewise, whereby hollow structures capable of withstanding great internal pressure may be produced. A still further object is to provide sheet piles so constructed that the same may be inspected from top to bottom after driving for the detection of fractures, distortion or other undesirable conditions. Another object is to provide steel sheet piles capable of attaining the foregoing objects, which may be manufactured easily and which will be relatively inexpensive. Still another object is to provide sheet piling structures of great rigidity and stability capable of withstanding great lateral pressure. Various other objects and the advantages of the invention may be ascertained from the following description and the accompanying drawings.

In one of its broad aspects, the invention resides in providing piles of concrete or metal, each formed with a longitudinal channel in one or both edges adapted, when the piles are driven in edge to edge relation, to form wells between adjoining piles into which a grouting of cement concrete may be poured, the piles being provided with transverse members or portions adapted to be engaged by the grouting to hold the piles against relative movement in their longitudinal direction and, in certain forms, also against separation from one another.

In another of its broad aspects, the invention resides in sheet piling structures of zig-zag, corrugated or arched form composed of sheet piles interlocked against relative movement in their longitudinal direction.

In greater detail, the invention resides in the features and combinations of features disclosed in the following description and/or the accompanying drawings illustrating certain embodiments of the invention, but to which embodiments and the details thereof the invention is not confined, together with all such modifications thereof and substitution of equivalents therefor as lie within the scope of the appended claims.

In the drawings:—

Fig. 1 is a side elevation of a concrete sheet pile formed according to this invention.

Fig. 2 is an edge elevation of the pile of Figure 1.

Fig. 3 is a plan view of the pile.

Fig. 4 is a plan view illustrating, on an enlarged scale as compared with Figure 3, an assemblage of fragments of two concrete piles.

Fig. 5 is a fragmentary elevation, partly in vertical section, of the assembly shown in Figure 4.

Figure 14:
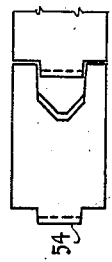
Figs. 6, 8, 10, 12 and 14 are views similar to Figure 4 illustrating various means for locking the piles together.
Figure 15:
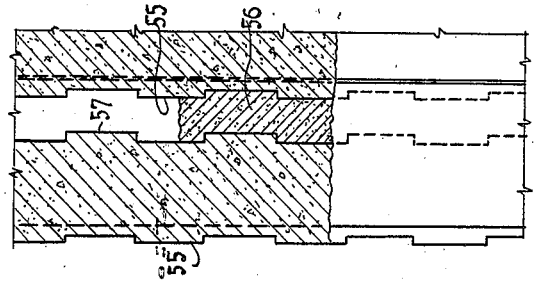
Figs. 7, 9, 11, 13 and 15 are fragmentary elevations partly in vertical section of the structures of Figures 6, 8, 10, 12 and 14 respectively.
Figure 12:
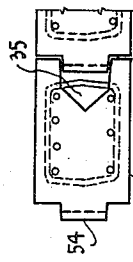
Figure 13:
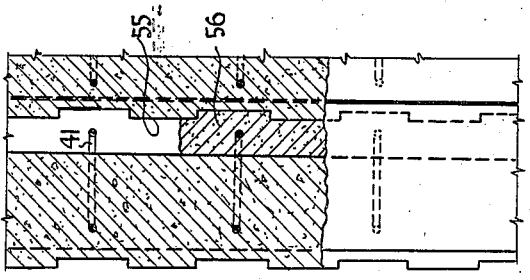

Referring more particularly to the drawings and especially to Figures 1 to 15 thereof, 31 designates a concrete sheet pile which is illustrated as being of oblong rectangular cross-section, but it will be understood the piles may have any other suitable cross-section. The two opposite wider sides 32 of the pile are usually parallel and plain-surfaced while the two opposite narrower sides 34 are usually parallel and are each formed with a channel or groove 35 which may extend from end to end of the pile or any lesser distance. The pile material 36 on opposite sides of and defining the grooves is, for convenience, hereafter referred to as the flanges. The upper end 37 of the pile is flat. At the lower end, the wider sides 32 converge sharply to form a chisel edge 38. At a point some distance above the chisel edge, one of the narrower sides 32 slopes sharply toward the other narrower edge to provide an inclined surface 39 which, when the pile is being driven, causes the same to be urged against a previously driven pile. The grooves 35 are preferably V-shaped at the bottom, as shown, but may be of any other suitable shape.

The pile is reinforced by a series of longitudinal rods 40 extending substantially from end to end thereof and by a series of substantially rectangular hoops 41, or equivalent, preferably encircling the group of rods 40. The central parts of the end portions 42 of the hoops are exposed in the grooves 35, which are of such depth that the exposed hoop portions are spaced materially outward from the bottoms of the grooves. The hoops may be of the simple, generally rectangular form shown in Figure 3. It will be noted the exposed end portions 42 of the hoops are slightly arched or bowed outwards.

If desired, dowel pins 43 hooked at their lower ends as at 44 may be located in the grooves and project above the piles for anchoring a superstructure.

When piles, as previously described, are driven with the grooves of adjoining piles communicating, a series of wells are formed. Earthy matter lodged in the grooves during driving of the piles may be washed out with water under pressure, thus leaving the whole length of the piles available for inspection by means of a light and mirror lowered into the wells. After the grooves 35 have been cleared out and after inspection, if any, a grouting of cement concrete is poured into the wells to fill the same. When the grouting has hardened, it forms a water tight connecting member 45 between adjoining piles which holds the piles in alignment and, by reason of embedding engagement with the exposed hoop ends 42, also holds the piles securely against relative movement in their longitudinal direction and against separation edgewise.

Figure 8:
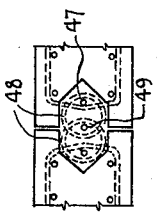
Figure 9:
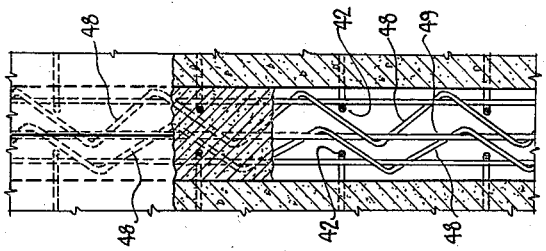
Figure 6:
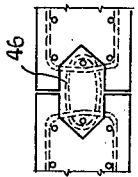
Figure 7:
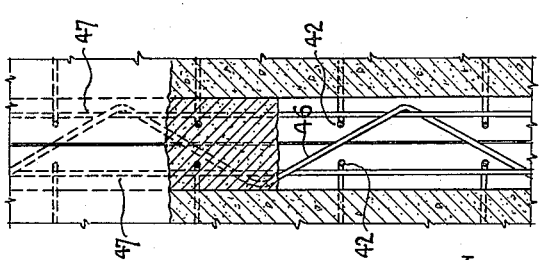

If it is desired to further secure the piles against separation in their edgewise direction, any suitable form of metal tension connection is established between the exposed hoop portions of adjoining piles, for example, as shown in Figures 6 to 9. In Figures 6 and 7, there is shown a flattened helically formed connector 46 adapted to be inserted in the communicating grooves and to penetrate laterally between the exposed hoop portions 42 and the bottoms of the grooves. Locking rods 47 are then inserted inside the helix 46 and between the exposed hoop portions 42 and the bottoms of the grooves, so as to establish the desired tension connection. In Figures 8 and 9, two helical members 48 are used, each locked to the hoops of one pile by locking rods, as previously described. The helices of the members 48 are arranged in interdigitating relation and are locked together by a rod 49, which passes through the helices of both members 48.

Figure 10:
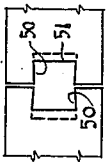
Figure 11:
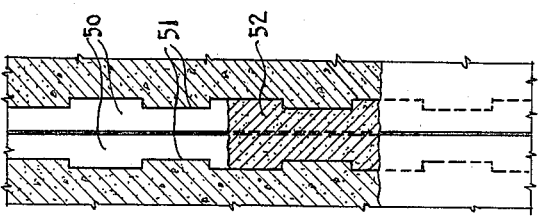

In Figures 10 and 11, there is illustrated a modification applicable particularly to piles constructed without the reinforcement necessary to provide the groove traversing metal members 42 of the previously described forms. In this modification, the grooves 50 are preferably undercut as shown in Fig. 10, so as to provide a certain amount of tension connection between piles, and are formed with ribs 51 extending from side to side of the grooves and spaced in the longitudinal direction of the piles. When the grouting has been poured into the communicating grooves and has set, it forms a connecting member 52 which by its engagement with the ribs 51 holds the piles against relative movement in their longitudinal direction.

In Figures 12 to 15 there are shown modifications in which the piles 53 are grooved at one edge as before and provided at the other edge with a tongue or rib 54 adapted to enter the groove of the adjoining pile and constitute a guide to keep the piles in alignment during driving. These tongues preferably extend only part way to the bottoms of the grooves so as to leave a well as before. The outer face of the tongue is provided with transverse ribs 55 spaced in the longitudinal direction of the pile and, if hoops 41 are used, preferably alternated with the hoops. In the form of pile shown in Figs. 12 and 13, when the grouting 56 is poured and set, it interlocks with the ribs 55 of one pile and the hoops 41 of the next to hold the piles against relative movement in their longitudinal directions. In the form of pile shown in Figures 14 and 15, the bottoms of the grooves are provided with transverse ribs 57 preferably located opposite the spaces between the tongue ribs 55. The grouting 56 interlocks with the ribs of adjoining piles to hold them against relative longitudinal movement.

Various other combinations of the features may be made.

Figure 16:
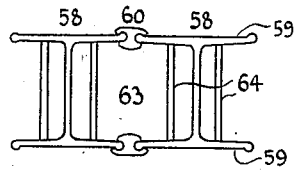
Figs. 16 and 18 are plan views of two forms of interlocking steel piles according to this invention.
Figure 18:
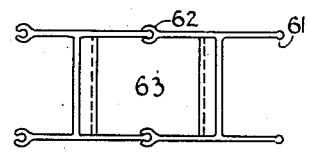
Figure 17:
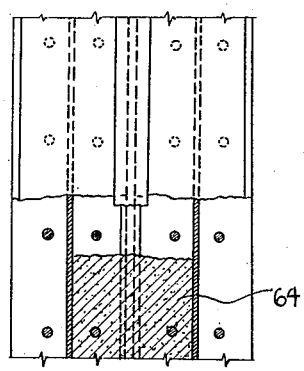
Figs. 17 and 19 are fragmentary elevations, partly in vertical section, of the structures of Figs. 16 and 18 respectively.

The invention may be embodied also in metal sheet piles as shown in Figs. 16 to 21. In this embodiment the piles 58 are of H section having the edges of their flanges 59 formed in any usual or suitable way for guiding during driving and tension interlocking when driven. For example, the edges of the pile flanges may be all of bulb section, as shown in Fig. 16, and separating interlocking members 60 embracing the bulbous edges may connect adjacent piles and may be left in position or withdrawn after driving of the piles. Alternatively, the pile flanges may be formed as is usual in sheet metal piling, that is, with a bulb 16 section at one edge and C-shaped jaw structure 62 at the other edge to embrace the bulbous edge of the adjoining pile, as shown in Fig. 18.

The piles when driven with their flange edges in abutting relation form a series of wells 63 into which a grouting 64 of concrete may be poured. A disadvantage of ordinary metal sheet piling is that the piles are not interlocked against relative movement in their longitudinal directions. This disadvantage is overcome according to this invention by providing the metal piles with means to interlock with the grouting. The most simple form of such means is the provision of bars extending between the pile flanges and spaced outwardly of the pile webs. Alternatively, the pile webs may be provided with transverse projections or ribs which may be formed integral with or attached to the webs or the webs may be apertured for entrance of the grouting to interlock with the piles.

Figure 19:
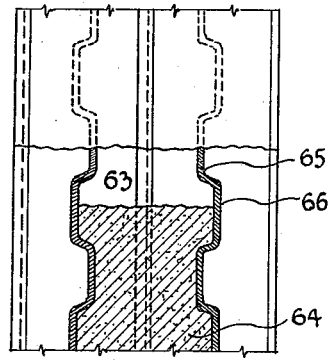
Figure 20:
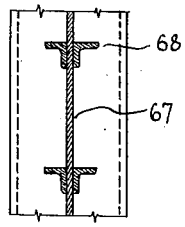
Fig. 20 is a vertical sectional view of a modified form of steel pile.
Figure 22:
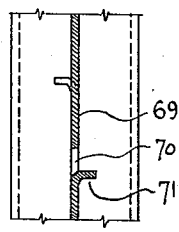
Fig. 22 is a vertical section on the line 22—22 of Figure 21.
Figure 21:
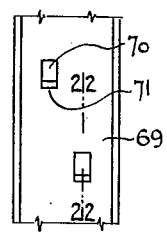
Fig. 21 is an edge elevation of a further modified form of steel pile.

In Figs. 18 and 19 the pile webs 65 are provided with the aforesaid projections 66 by corrugated formation of the webs while in Fig. 20 the webs 67 have attached projections or ribs 68, such as angle bars, secured in any suitable way to the webs. In Figs. 21 and 22, the web 69 is shown provided with apertures 70, which may be staggered. In this form, the metal displaced to provide the apertures may remain connected to the web and form projections also as shown at 71.

The metal piles of this invention may be manufactured in various ways. Suitable sections may be rolled in the usual manner and then treated as shown in Figs. 16, 17 and 20 to 22. The corrugated webs of Figs. 18 and 19 may also be rolled in but this method of manufacture presents difficulties unless the corrugation is confined to the central parts of the webs. My preferred method of producing the metal piles is to transversely corrugate a flat strip of metal and then weld it to two suitable flange members, such as metal sheet piles of any standard section.

Figure 23:
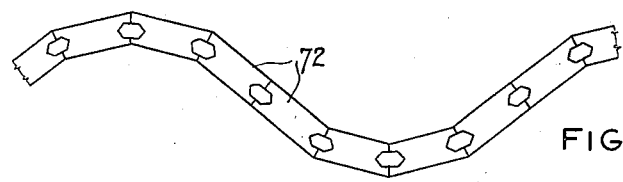
Figs. 23 and 24 are plan views of piling structures according to this invention.
Figure 24:
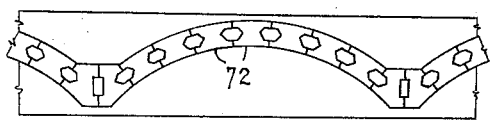

This invention particularly contemplates a zigzag, corrugated or arched arrangement of concrete or metal piles, as shown in Figures 23 and 24, using as necessary piles 72 with their opposite channeled faces disposed out of parallelism but in all other respects as already described. These zig-zag structures have much greater resistance than straight walls to overturning by lateral pressure, the greater resistance being due to the locking of the piles against relative longitudinal movement. This locking against relative longitudinal movement is termed "shear locking" and a structure composed of piles so locked together is for all practical purposes monolithic.

An advantage effluent from the communicating channels is that, when the piles are driven to rock, the grouting may extend into contact with the rock and thus anchor the piles and, in addition, provides a water-tight connection between the piles and rock. If the rock surface is too smooth for good natural bonding with the grouting, rock drills may be operated in the communicating channels to drill footings in the rock or to provide for insertion of anchor bolts.

The outward bowing of the exposed hoop portions 42 ensures that when metal tension connections are used between piles, the ends of the hoops are tensioned and have but slight tendency to flexion, such as would tend to break off the flanges 36.

While the members 41 have been shown and described as hoops, it will be understood that U-shaped members embedded at their ends in the concrete may be substituted and will serve equally well for shear locking purposes and that such U-shaped members, if formed of suitable material such as twisted square bar, will be serviceable also for attachment of the tension connections. If desired, the reinforcing rods 47 (Figs. 6 to 9) may be omitted and the helical reinforcing rods 46 or 48 or non-helical zig-zag rods used alone as reinforcing for the grouting.

Having thus described my invention, what I claim is:—

1. A generally quadrilateral sheet pile formed with a longitudinal channel in one of its sides and including means located at intervals in the length of the channel extending from side to side of said channel and outwardly of the bottom thereof, said means being adapted for embedment in a grouting poured in the channel after the pile is driven and interlocking with an adjoining pile whereby said first mentioned pile is held against movement in its longitudinal direction relatively to the adjoining pile.

2. A generally quadrilateral sheet pile formed with a longitudinal channel in each of two opposite sides and including means located at intervals in the length of each channel extending from side to side of said channel and outwardly of the bottom thereof, said means being adapted for embedment in a grouting poured in the channel after the pile is driven and interlocking with an adjoining pile whereby said first mentioned pile is held against movement in its longitudinal direction relatively to the adjoining pile.

3. A generally quadrilateral sheet pile formed with a longitudinal channel in one of its sides and including means located at intervals in the length of the channel extending from side to side of the channel and spaced outwardly of the bottom thereof, said means being adapted for embedment in a grouting poured in the channel after the pile is driven and interlocking with an adjoining pile whereby said first mentioned pile is held against movement in its longitudinal direction relatively to the adjoining pile.

4. A generally quadrilateral sheet pile formed with longitudinal channels in opposite faces thereof and transverse ribs located at intervals in the length of said channels extending from substantially side to side of said channels and outwardly from the bottoms thereof, said means being adapted for embedment in a grouting poured in the channel after the pile is driven and interlocking with an adjoining pile whereby said first mentioned pile is held against movement in its longitudinal direction relatively to the adjoining pile.

5. A concrete sheet pile formed with a longitudinal channel in an edge surface thereof and including transverse reinforcing members, the medial portions of which are exposed in and extend from side to side of the channel in spaced relation to the channel bottom.

6. A concrete sheet pile formed with longitudinal channels in opposite surfaces thereof and including longitudinal reinforcing rods, a series of hoops encircling the group of rods and having portions exposed in the channels and extending from side to side of the channels in spaced relation to the channel bottoms.

7. A concrete sheet pile formed with a longitudinal channel and transverse ribs in the bottom of said channel spaced in the direction of pile length and extending outwardly from the channel bottom.

8. A concrete sheet pile formed with a longitudinal channel and a longitudinal rib on the opposite face from said channel, said rib being adapted to enter the channel of a similar adjoining pile and being of less depth than the depth of the channel, means extending from side to side of said chanel and outwardly of the bottom thereof and transverse ribs on said longitudinal rib.

9. A sheet metal pile of substantially H-section comprising flanges and a web connecting the flanges and providing oppositely facing channels, and means located at intervals in the length of each of said channels extending from flange to flange of said pile and outwardly of the web thereof, said means being adapted for embedment in a grouting poured in the channel after the pile is driven and interlocking with an adjoining pile whereby said first mentioned pile is held against movement in its longitudinal direction relatively to the adjoining pile.

10. A metal sheet pile of substantially H-section, comprising flanges and a web connecting the flanges and providing oppositely facing channels and bars extending from flange to flange of the pile and spaced outwardly of the web thereof.

11. A metal sheet pile of substantially H-section, comprising flanges and a web connecting the flanges and providing oppositely facing channels, and a plurality of ribs connected to each side of the web at intervals in the length thereof and extending outwardly therefrom and substantially from flange to flange.

12. A metal sheet pile of substantially H-section comprising flanges and a web connecting the flanges and providing oppositely facing channels, the web of said pile being formed with an uneven surface to provide transverse thrust surfaces for engagement with grouting occupying the channels.

13. A metal sheet pile of substantially H-section comprising flanges and a web connecting the flanges and providing oppositely facing channels, the web of said pile being formed with transversely extending corrugations.

ERIC C. MOLKE.